United States Patent

[11] 3,627,846

| [72] | Inventor | Karl-Heinrich Meyer<br>Krefeld-Bockum, Germany |
|---|---|---|
| [21] | Appl. No. | 768,968 |
| [22] | Filed | Oct. 16, 1968 |
| [45] | Patented | Dec. 14, 1971 |
| [73] | Assignee | Farbenfabriken Bayer Aktiengesellschaft<br>Leverkusen, Germany |
| [32] | Priority | June 11, 1965 |
| [33] | | Germany |
| [31] | | F 46295 |
| | | Continuation of application Ser. No.<br>538,234, Mar. 29, 1966, now abandoned.<br>This application Oct. 16, 1968, Ser. No.<br>768,968 |

[54] PROCESS FOR OBTAINING PARTICULARLY PURE 2,2-BIS-(PHENYLOL)-PROPANE
4 Claims, No Drawings

[52] U.S. Cl. ............................................... 260/619, 260/47

[51] Int. Cl. ........................................... C07c 39/16, C08f 7/10
[50] Field of Search ................................ 260/619, 619 A, 619 B

[56] References Cited
UNITED STATES PATENTS

| 2,623,908 | 12/1952 | Stoesser et al. | 260/619 |
| 2,917,550 | 12/1959 | Dietzler | 260/619 |

*Primary Examiner*—Leon Zitver
*Assistant Examiner*—Norman P. Morgenstern
*Attorney*—Connolly and Hutz

ABSTRACT: Process for obtaining particularly pure bisphenol A from a crude mixture obtained by reacting acetone with excess phenol comprising degassing the crude mixture to remove acetone and HCl by subjecting the mixture to reduced pressure, separating the crystalline addition product of phenol and bisphenol A precipitating from the mixture, washing the precipitate with phenol and splitting it into bisphenol and phenol.

PROCESS FOR OBTAINING PARTICULARLY PURE 2,2-BIS-(PHENYLOL)-PROPANE

This application is a continuation of application Ser. No. 538,234 filed Mar. 29, 1966, now abandoned.

In the hitherto known processes for obtaining bisphenol A from such a crude mixture, the crude mixture is freed from the excess phenol, unreacted acetone, hydrogen chloride and the water formed, by distilling off these substances and the remaining bisphenol is purified by extraction or recrystallization, optionally after its distillation. Substantial losses occur in this process. To obtain a very pure bisphenol, the extraction or recrystallization has generally to be repeated several times.

According to another, more advantageous process, the crude mixture is neutralized with aqueous alkali, the separating organic phase is removed form the aqueous phase, washed with water and then cooled, whereby the addition product of 1 mol bisphenol and 1 mol phenol crystallizes out from the water-containing phenolic mother liquid. The product is separated and the bisphenol is obtained therefrom by distilling off the phenol. In this way, the bisphenol is obtained in a yield of about 82 percent, referred to the reacted acetone and with a degree of purity of at most about 99.5 percent. After distilling off the mother liquor, about 18 percent by weight remain in the form of a dark resin as the residue.

The process according to the present invention consists in degassing the crude mixture obtained as described above from unreacted acetone and from hydrogen chloride by subjecting it to reduced pressure or by blowing out the crude mixture with an inert gas, such as nitrogen, separating the precipitated crystalline addition product of bisphenol and phenol from the mother liquor, washing it with phenol and then splitting it in known manner into bisphenol and phenol.

By the action of the reduced pressure or by the blowing out with inert gas, the unreacted acetone evaporates, which cam be recovered by condensation, and the hydrogen chloride dissolved in the crude mixture is driven off. By the removal of the acetone and by the cooling down of the mixture below about 35° C. brought about by the evaporation of the acetone and the driving off of the hydrogen chloride, the solubility of the addition product of bisphenol and phenol is reduced to such an extent that it crystallizes out almost completely from the remaining phenol solution.

In order to have available sufficient acetone for the evaporation from the crude mixture, it is expedient, when preparing the crude mixture, to limit the conversion, e.g. to about 50 to 80 percent, referred to the acetone employed.

It is surprising that, according to this process, not only an especially pure addition product and, after its splitting, an especially pure bisphenol is obtained, but also a substantially larger yield of these products than that obtained by the processes previously in use.

In addition, the mother liquor essentially consists only of phenol and small amounts of noncrystallized bisphenol and it contains only traces or organic impurities, water, acetone and hydrogen chloride. It can, therefore, easily be used, if necessary after the addition of fresh phenol, to prepare a new crude mixture by the reaction with acetone, which can then again be worked up according to the invention. It is also surprising that the mother liquor again obtained loss does not contain more organic impurities and that, consequently, the mother liquor resulting in each case can be used again for the preparation of bisphenol.

The following Examples are given for the purpose of illustrating the invention.

EXAMPLE 1

In each of three parallel batches, 564 g. phenol (6 mol) and 29 g. acetone (0.5 mol) are heated to 34° C. in a glass flask, with the addition of 0.3 g. β-mercaptopropionic acid as accelerator. The solution thus formed is saturated with hydrogen chloride within 20 minutes by introducing 7 g. of hydrogen chloride gas, the temperature of the solution being kept at 47° C. by cooling. When a conversion of about 50 percent of the acetone is attained, the reaction solutions are worked up by three different methods (a, b and c).

a. 60 Litres nitrogen are blown through the reaction solution within 90 minutes, this is thus cooled down to 32° C., whereby the bisphenol/phenol addition product is deposited in crystalline form. It is filtered off with suction by means of a suction filter and subsequently washed with 37 g. phenol at 45° C.

The mother liquor together with the wash phenol weighs 506 g. and contains 88.5 percent phenol, 7.3 percent bisphenol A and 2 percent organic impurities. The mother liquor also contains 0.05 percent hydrogen chloride, 0.8 percent water and 0.5 percent acetone.

124 g. of an acid-free colorless bisphenol/phenol addition product are obtained from which, after distilling off the phenol at 170° C. and 20 mm. Hg, there are obtained 63.2 g. bisphenol with a solidification point 156.60° C. and the iodine color number 0.27. The content of organic impurities in the bisphenol lies below the detection limit of 0.1 percent.

b. The reaction solution is degassed in a vacuum of 10 mm. Hg. in a glass apparatus, whereby the temperature of the solution decreases to 35° C. within 60 minutes. The resulting crystals are separated as described under (a) and washed with 60 g. phenol at 45° C.

520 g. mother liquor (including the wash phenol) are obtained. They contain 89.2 percent phenol, 7.6 percent bisphenol A, 1.6 percent organic impurities, 0.01 percent hydrogen chloride, 0.55 percent acetone and 1 percent water. The amount of bisphenol/phenol addition product is 131 g. 61,8 g. bisphenol A are obtained therefrom. Solidification point: 156.65° C., iodine color number: 0.25. The content of organic impurities lies below the detection limit of 0.1 percent.

c. (control experiment)

The reaction solution is adjusted to pH 5-6 with 94 ml. 2N sodium hydroxide solution in a glass flask, while stirring, and the salt water layer which separates at the bottom is removed. In this way, 676 g. of an organic liquid are retained which are washed with 110 cc. water and again separated. Since no crystals of the addition product separate due to the cooling down of this solution and because of the large phenol/water excess, the organic solution is freed from water and phenol by distillation at 75° C./20 mm. Hg for 1 hour until 264 g. still remain as residue. From this solution there are obtained by cooling and crystallization 152 g. bisphenol/phenol addition product which is separated an washed at 45° C. with 66 g. phenol. There are also obtained 178 g. mother liquor with a content of 4.1 percent bisphenol A and 2.0 percent organic impurities. Solidification point: 155.7° C., iodine color number: 1.5. The content of organic impurities amounts to 0.9 percent.

Whereas the bisphenol A obtained in the experiments (a) and (b) is outstandingly suitable e.g. for the production of a high molecular and colorless polycarbonate, only a dark yellow polycarbonate can be obtained from the bisphenol A obtained in experiment (c).

EXAMPLE

EXAMPLE 2

The condensation reaction as described in example 1 is successively carried out in six experiments in glass flasks of 4 litres capacity but, from the second experiment onwards, the mother liquor previously obtained in each case is here reacted with acetone and hydrogen chloride, always supplementing that amount of phenol which has been removed from the reaction mixture as reacted or bound phenol in the form of the bisphenol/ phenol addition product.

2.468 g. phenol, 127 g. acetone, 2.6 g. β-mercaptopropionic acid are heated to 47° C. in the first batch. 38 g. hydrogen chloride are introduced into the mixture within 30 minutes, the mixture being kept at 47° C. When about 50 percent of the acetone are reacted, 300 litres nitrogen are blown through the solution in the course of 90 minutes and thereby slowly cooled to 32° C. The precipitating bisphenol/phenol addition product is separated as described in example 1 (a), washed with phenol and freed from the phenol by vacuum distillation. Before being used again, the mother liquor is stirred at 40° C/10 mm. Hg for 30 minutes so that the water content is decreased from 2.0–2.3 percent to 1.0–1.2 percent. The following table shows the composition of each of the mother liquors obtained under (a) to (f), the yields obtained in this series of experiments are the quality of the bisphenol A.

TABLE TO EXAMPLE 2

| Experiment series | a | b | c | d | e | f |
|---|---|---|---|---|---|---|
| Amounts employed, g.: | | | | | | |
| Acetone | 127 | 127 | 127 | 127 | 127 | 127 |
| Phenol | 2,468 | 236 | 298 | 364 | 360 | 350 |
| Mother liquir plus wash phenol | | 2,232 | 2,170 | 2,104 | 2,108 | 2,118 |
| Fresh wash phenol | 181 | 159 | 264 | 168 | 191 | 189 |
| HCl gas | 38 | 38 | 38 | 38 | 38 | 38 |
| β-mercaptopropionic acid | 2.6 | 0.55 | 0.55 | 0.55 | 0.55 | 0.55 |
| Amounts obtained, g.: | | | | | | |
| Mother liquor plus wash phenol | 2,232 | 2,170 | 2,104 | 2,108 | 2,118 | 2,135 |
| Bisphenol/phenol addition products | 464 | 513 | 696 | 605 | 609 | 608 |
| Chemical composition of the mother liquor including wash phenol percent: | | | | | | |
| Bisphenol A | 6.14 | 8.05 | 6.81 | 5.81 | 7.32 | 7.71 |
| Isomers | 1.56 | 1.85 | 1.39 | 0.89 | 1.38 | 1.39 |
| Chroman plus resins | <0.1 | <0.1 | <0.1 | <0.1 | <0.1 | <0.1 |
| HCl | 0.02 | 0.03 | 0.001 | 0.05 | 0.01 | 0.02 |
| Water | 1.13 | 1.04 | 0.48 | 1.08 | 1.05 | 1.27 |
| Acetone | 0.30 | 0.50 | 0.32 | 0.20 | 0.40 | 0.27 |
| Phenol | 90.75 | 88.43 | 90.82 | 91.87 | 89.74 | 89.24 |
| Bisphenol A obtained: | | | | | | |
| Amount, g | 268 | 318 | 388 | 397 | 390 | 381 |
| Solidification point, °C | 156.6 | 156.6 | 156.6 | 156.6 | 156.6 | 156.6 |
| Iodine colour number | 0.25 | 0.30 | 0.25 | 0.35 | 0.25 | 0.30 |
| Organic impurities, percent | <0.1 | <0.1 | <0.1 | <0.1 | <0.1 | <0.1 |

The bisphenol A obtained is in each case very well suited for the production of polycarbonate.

The yields calculated from the aforesaid batches are as follows:

| | | |
|---|---|---|
| phenol primarily employed | 2.468 g. | |
| sum total of wash phenol | 1.152 g. | I |
| sum total of the freshly added phenol | 1.608 g. | |
| | 5.228 g. phenol | |

A mother liquor of 2135 g. is recovered.
Therein are contained:

| | | |
|---|---|---|
| 89% phenol | 1.900 g. | |
| Bound phenol in the form of bisphenol and isomers | 160 g. | II |
| | 2.060 g. phenol | |

Thus, phenol consumed for the formation of the bisphenol/phenol addition product $$\begin{array}{r}5.228\text{ g.}\\-2.060\text{ g.}\\\hline 3.168\text{ g. phenol}\end{array}$$  III A total of 3495 g. of bisphenol/phenol addition product are obtained which contain 3112 g. of reacted and free phenol, i.e. the yield, with regard to phenol, amounts to 98.2 percent.

The yield, referred to the acetone employed, amounts to 71.6 percent. In addition, a further 194 g. or 25.5 percent acetone re recovered by freezing out and washing of the hydrogen chloride/acetone vapors driven off, so that the yield of bisphenol, with regard to acetone, amounts to 97.1 percent.

If the gas extraction of the reaction solution is carried out by using a vacuum by means of blowers, instead of blowing out with nitrogen, then the hydrogen chloride/acetone vapors can be introduced directly into the next batch, so that in this way even the losses of hydrogen chloride are avoided.

We claim

1. A process which comprises reacting acetone and at least about a four-fold equivalent excess of phenol in the presence of hydrogen chloride at a temperature form about 35° to about 65° C. limiting the conversion to about 50 to 80 percent based on said acetone, degassing resulting crude reaction mixture but subjecting said resulting reaction mixture to a reduced pressure which simultaneously removes acetone and hydrogen chloride by evaporation and cools the reaction mixture to a temperature below about 35° C. and recovering resulting crystalline addition product of bisphenol A and phenol.

2. The process of claim 1 wherein said crystalline addition product is separated from said degassed crude reaction mixture and resulting mother liquor and recovered acetone and hydrogen chloride are recycled to obtain additional crude reaction mixture.

3. A process which comprises reacting acetone and at least about a four-fold equivalent excess of phenol in the presence of hydrogen chloride at a temperature of about 35° to about 65° C., limiting the conversion to about 50 to 80 percent based on said acetone, degassing resulting crude reaction mixture by blowing said mixture with an inert gas which simultaneously removes acetone and hydrogen chloride by evaporation and cools the reaction mixture to a temperature below about 35° C. and recovering resulting crystalline addition product of bisphenol A and phenol.

4. The process of claim 3 wherein said crystalline addition product is separated form said degassed crude reaction mixture and resulting mother liquor and recovered acetone and hydrogen chloride are recycled to obtain additional crude reaction mixture.

* * * * *